United States Patent
Nitta et al.

(10) Patent No.: US 9,643,347 B2
(45) Date of Patent: May 9, 2017

(54) HEAT-RESISTANT LAMINATED CONVEYER BELT

(71) Applicants: Mitsubishi Heavy Industries Printing & Packaging Machinery, Ltd., Mihara-shi, Hiroshima (JP); Chukoh Chemical Industries, Ltd., Minato-ku, Tokyo (JP)

(72) Inventors: Takashi Nitta, Tokyo (JP); Kazuki Mizushima, Tokyo (JP); Hideo Imazato, Matsuura (JP); Tomomi Haraguchi, Matsuura (JP); Keigo Futatsuki, Matsuura (JP); Kimihiro Yamakawa, Tokyo (JP)

(73) Assignees: Mitsubishi Heavy Industries Printing & Packaging Machinery, Ltd., Mihara-shi, Hiroshima (JP); Chukoh Chemical Industries, Ltd., Minato-ku, Tokyo (JP)

( * ) Notice: Subject to any disclaimer, the term of this patent is extended or adjusted under 35 U.S.C. 154(b) by 26 days.

(21) Appl. No.: 14/678,721

(22) Filed: Apr. 3, 2015

(65) Prior Publication Data
US 2015/0217490 A1    Aug. 6, 2015

Related U.S. Application Data

(63) Continuation of application No. 13/344,467, filed on Jan. 5, 2012, now abandoned, which is a continuation
(Continued)

(30) Foreign Application Priority Data

Jul. 7, 2009 (JP) ................................ 2009-160995

(51) Int. Cl.
B29C 43/20 (2006.01)
B65G 15/38 (2006.01)
(Continued)

(52) U.S. Cl.
CPC ............ *B29C 43/203* (2013.01); *B65G 15/38* (2013.01); *B29K 2027/12* (2013.01);
(Continued)

(58) Field of Classification Search
CPC ............... B29C 43/203; B29L 2029/00; B65G 2207/22; B65G 15/38; B29K 2027/12;
(Continued)

(56) References Cited

U.S. PATENT DOCUMENTS 3,924,482 A   12/1975  Meadows
4,052,243 A   10/1977  Yazawa
(Continued)

FOREIGN PATENT DOCUMENTS

CN   101240476 A   8/2008
CN   101428705 A   5/2009
(Continued)

OTHER PUBLICATIONS

Korean Office Action mailed Jun. 29, 2015, issued in corresponding Korean Application No. 10-2014-7021363, 6 pages.
(Continued)

*Primary Examiner* — Jeremy R Pierce
(74) *Attorney, Agent, or Firm* — Christensen O'Connor Johnson Kindness PLLC

(57) ABSTRACT

A heat-resistant laminated conveyer belt includes a fluororesin-coated core and a reinforcement layer which is formed on the core through an adhesive layer. The core is obtained by impregnating an aramid fiber woven fabric in a fluororesin dispersion and drying and sintering the fabric. The reinforcement layer is obtained by impregnating an aramid fiber woven fabric to which stretch properties are applied in a fluororesin dispersion and drying and sintering the fabric. The aramid fiber woven fabric of the core is a woven fabric by a plain-weave seamless loom or a circular
(Continued)

loom. The aramid fiber woven fabric of the core includes an S-twist weft yarn and a Z-twist weft yarn which are alternatively arranged.

10 Claims, 6 Drawing Sheets

Related U.S. Application Data of application No. PCT/JP2010/061554, filed on Jul. 7, 2010.

(51) Int. Cl.
*B29K 27/12* (2006.01)
*B29K 71/00* (2006.01)
*B29K 105/00* (2006.01)
*B29K 105/08* (2006.01)
*B29L 29/00* (2006.01)

(52) U.S. Cl.
CPC .. *B29K 2071/00* (2013.01); *B29K 2105/0085* (2013.01); *B29K 2105/0845* (2013.01); *B29K 2277/10* (2013.01); *B29L 2029/00* (2013.01); *B65G 2207/22* (2013.01); *Y10T 442/322* (2015.04)

(58) Field of Classification Search
CPC ........ B29K 2071/00; B29K 2105/0085; B29K 2105/0845; B29K 2277/10; Y10T 442/322
See application file for complete search history.

(56) References Cited

U.S. PATENT DOCUMENTS

| | | | |
|---|---|---|---|
| 5,382,200 A | 1/1995 | Kimoto | |
| 5,387,300 A | 2/1995 | Kitamura | |
| 5,421,450 A | 6/1995 | Kitagawa | |
| 5,529,545 A | 6/1996 | Isshiki | |
| 5,766,534 A * | 6/1998 | White | B29C 70/543 264/137 |
| 6,092,579 A | 7/2000 | Bradatsch | |
| 6,325,110 B1 | 12/2001 | Scari | |
| 8,056,707 B2 | 11/2011 | Ishibuchi | |
| 2004/0138372 A1* | 7/2004 | Uschold | B29C 66/7292 524/544 |
| 2006/0244170 A1* | 11/2006 | Brentrup | B29C 70/506 264/122 |
| 2009/0014122 A1 | 1/2009 | Ishibuchi | |

FOREIGN PATENT DOCUMENTS

| | | |
|---|---|---|
| EP | 1 752 283 A1 | 2/2007 |
| JP | 6-107311 A | 4/1994 |
| JP | 8-67318 A | 3/1996 |
| JP | 10-119152 A | 5/1998 |
| JP | 2584218 Y2 | 8/1998 |
| JP | 11-105171 A | 4/1999 |
| JP | 11-301825 A | 11/1999 |
| JP | 11-322036 A | 11/1999 |
| JP | 2000-103511 A | 4/2000 |
| JP | 2000-168930 A | 6/2000 |
| JP | 20011134107 A | 5/2001 |
| JP | 2005-104689 A | 4/2005 |
| KR | 1994-0006943 B1 | 7/1994 |
| WO | 2005/110728 A1 | 11/2005 |

OTHER PUBLICATIONS

Notification of Third Office Action mailed Jan. 15, 2016, in CN Application No. 201080030205.4, filed Jul. 7, 2010, 20 pages.
Advisory Action mailed Jul. 8, 2011, issued in U.S. Appl. No. 10/590,147, filed Dec. 1, 2006, now U.S. Pat. No. 8,056,707, 3 pages.
Canadian Office Action mailed Nov. 20, 2009, issued in Canadian Patent Application No. 2,557,618, filed May 16, 2005, 3 pages.
First Office Action (CN), mailed Jul. 2, 2013, issued in corresponding Chinese Application No. 201080030205.4, filed Jul. 7, 2010, 19 pages.
First Office Action, mailed Oct. 28, 2014, issued in related Japanese Application No. 2013-238239, filed Nov. 18, 2013, 7 pages.
Information Disclosure Statement mailed Dec. 18, 2009, submitted in U.S. Appl. No. 10/590,147, filed Dec. 1, 2006, now U.S. Pat. No. 8,056,707, 4 pages.
Information Disclosure Statement mailed Sep. 20, 2011, submitted in U.S. Appl. No. 10/590,147, filed Dec. 1, 2006, now U.S. Pat. No. 8,056,707, 4 pages.
International Preliminary Report on Patentability mailed Jan. 18, 2007, issued in International Application No. PCT/JP2005/008851, filed May 16, 2005, which corresponds to U.S. Pat. No. 8,056,707, 8 pages.
International Preliminary Report on Patentability, mailed Feb. 23, 2012, issued in corresponding International Application No. PCT/JP2010/061554, filed Jul. 7, 2010, 7 pages.
International Search Report mailed Aug. 31, 2010, issued in corresponding International Application No. PCT/JP2010/061554, filed Jul. 7, 2010, 3 pages.
Notice of Reasons for Rejection (JP), mailed Jun. 4, 2013, issued in related Japanese Application No. 2011-521947, 8 pages.
Notification of Reason(s) for Refusal mailed Aug. 9, 2011, issued in Japanese Application No. 2006-519542, 11 pages, with English translation.
Office Action mailed Aug. 19, 2009, issued in U.S. Appl. No. 10/590,147, filed Dec. 1, 2006, now U.S. Pat. No. 8,056,707, 7 pages.
Office Action mailed Jan. 8, 2010, issued in U.S. Appl. No. 10/590,147, filed Dec. 1, 2006, now U.S. Pat. No. 8,056,707, 11 pages.
Office Action mailed Jun. 24, 2010, issued in U.S. Appl. No. 10/590,147, filed Dec. 1, 2006, now U.S. Pat. No. 8,056,707, 11 pages.
Office Action mailed Mar. 9, 2011, issued in U.S. Appl. No. 10/590,147, filed Dec. 1, 2006, now U.S. Pat. No. 8,056,707, 10 pages.
Office Action mailed Oct. 12, 2010, issued in U.S. Appl. No. 10/590,147, filed Dec. 1, 2006, now U.S. Pat. No. 8,056,707, 8 pages.
Office Action mailed Mar. 16, 2016, in KR Application No. 10-2012-7000135, filed Jan. 3, 2012, 7 pages.
Extended European Search Report mailed Nov. 18, 2016, in EP Application No. 10 797 159.0, filed Jul. 7, 2010, 8 pages.
Önder, E., and Ö.B. Berkalp, "Weaving Technology II Chapter 2: History of Weaving Classification of Weaving Machinery," Feb. 27, 2006, <http://web.itu.edu.tr/~berkalpo/Weaving_Lecture/WeaveTech_Chapter2_history.pdf> [retrieved Nov. 10, 2016], 32 pages.
Korean Office Action mailed Jan. 9, 2017, in KR Application No. 10-2016-7028004, filed Oct. 7, 2016, 6 pages.

* cited by examiner

HEAT-RESISTANT LAMINATED CONVEYER BELT

CROSS-REFERENCES TO RELATED APPLICATIONS

This application is a continuation of U.S. patent application Ser. No. 13/344,467, filed Jan. 5, 2012, now abandoned, which is a continuation of International Application No. PCT/JP2010/061554, filed Jul. 7, 2010, which claims priority to Japanese Patent Application No. 2009-160995, filed Jul. 7, 2009, the entire disclosures of which are incorporated herein by reference.

BACKGROUND OF THE INVENTION

1. Field of the Invention

The present invention relates to a heat-resistant laminated conveyer belt, particularly a heat-resistant laminated conveyer belt to be used for a corrugated board production machine.

2. Description of the Related Art

For example, a heat-resistant laminated conveyer belt having a configuration shown in FIGS. 1A and 1B is used for the corrugated board production machine (for example, Patent Literature 1). In this regard, FIG. 1A is a front view of the conveyer belt and FIG. 1B is a cross-sectional view along with line IB-IB of FIG. 1A.

A reinforcement layer 1 in the drawings is mainly responsible for mechanical strength of the belt. An abrasion-resistant layer 3 is formed on the reinforcement layer 1 through an adhesive layer 2 composed of a tetrafluoroethylene-perfluoroalkyl vinyl ether copolymer resin (PFA resin) film. Here, the abrasion-resistant layer 3 has a function for providing good bonding characteristics by applying abrasion resistance, mold-release characteristics, and hardness to the belt.

The reinforcement layer 1 is obtained by, for example, repeating several times a process of impregnating a woven fabric obtained by plain weaving an aramid fiber in a tetrafluoroethylene resin (PTFE resin) dispersion and drying and sintering the fabric. Alternatively, the reinforcement layer is obtained by repeating several times a process of impregnating a woven fabric obtained by circular knitting an aramid fiber in a PTFE resin dispersion and drying and sintering the fabric.

A four-layered conveyer belt in which an adhesive layer, an abrasion-resistant layer, and a sheet layer of a mixture obtained by mixing an aramid fiber and a PTFE resin are formed on the periphery side of the reinforcement layer and a three-layered conveyer belt in which a material obtained by coating an aramid fiber with polyimide and PFA resin is used as a wear-proof layer are suggested (for example, Patent Literature 2).

Further, a three-layered conveyer belt composed of a core, an adhesive layer, and a woven fabric as a surface layer is also suggested (for example, Patent Literature 3).

The heat-resistant laminated conveyer belt is used, for example, as a pressurizing belt in a process of producing a corrugated board as shown in FIG. 2. In FIG. 2, a corrugated board is produced by using a bonding method based on a pressurizing belt.

An upper roll 11 is engaged with a lower roll 12. Two pressure rolls 13a and 13b are arranged on the upper roll 11 adjacent to the upper roll 12. A 10 pressurizing belt 14 in an endless form is mounted on the pressure rolls 13a and 13b.

In the method of FIG. 2, a single-faced corrugated board sheet 17 is produced by passing a core paper 15 between the upper roll 11 and the lower roll 12 and between the upper roll 11 and the pressurizing belt 14 in a direction of an arrow X, passing a corrugated board liner 16 between the upper roll 11 and the pressurizing belt 14 in a direction of an arrow Y, and integrating the core paper 15 with the corrugated board liner 16 by an adhesive paste (not shown) to be applied onto the convex portion of the core paper 15 with a concavo-convex shape. When a laminate of the core paper 15 and the corrugated board liner 16 is passed between the upper roll 11 and the pressurizing belt 14, a pressure indicated by an arrow Z from the pressure rolls 13a and 13b through the pressurizing belt 14 is configured to be applied on the laminate.

Recently, the process of producing a corrugated board based on the pressurizing belt becomes a global mainstream in the industry. In such a circumstance, the pressurizing belt is used under severe conditions of hot environment, high-speed running, high tensile strength, high vibration, and adhesion of the adhesive paste. There is a demand for the pressurizing belt to correspond to the quality of paper for corrugated boards in each country. However, due to poor overall strength of the belt itself and poor surface hardness including abrasion resistance, a belt having the quality of material and the configuration does not sufficiently correspond to it at present.

CITATION LIST

Patent Literature Patent Literature 1: Jpn. UM Registration No. 2584218

Patent Literature 2: Jpn. Pat. Appln. KOKAI Publication No. 2005-104689

Patent Literature 3: Jpn. Pat. Appln. KOKAI Publication No. 11-105171.

BRIEF SUMMARY OF THE INVENTION

According to a first embodiment of the present invention, there is provided a heat-resistant laminated conveyer belt comprising:

a fluororesin-coated core obtained by impregnating an aramid fiber woven fabric in a fluororesin dispersion and drying and sintering the fabric; and a reinforcement layer which is formed on the core through an adhesive layer and obtained by impregnating an aramid fiber woven fabric to which stretch properties are applied in a fluororesin dispersion and drying and sintering the fabric;

wherein the aramid fiber woven fabric of the core is a woven fabric by a plain-weave seamless loom and the woven fabric includes an S-twist weft yarn and a Z-twist weft yarn which are alternatively arranged.

According to a second embodiment of the present invention, there is provided a heat-resistant laminated conveyer belt comprising:

a fluororesin-coated core obtained by impregnating an aramid fiber woven fabric in a fluororesin dispersion and drying and sintering the fabric; and a reinforcement layer which is formed on the core through an adhesive layer and obtained by impregnating an aramid fiber woven fabric to which stretch properties are applied in a fluororesin dispersion and drying and sintering the fabric;

wherein the aramid fiber woven fabric of the core is a woven fabric by a circular loom and the woven fabric includes an S-twist weft yarn and a Z-twist weft yarn which are alternatively arranged.

Figure 1A:
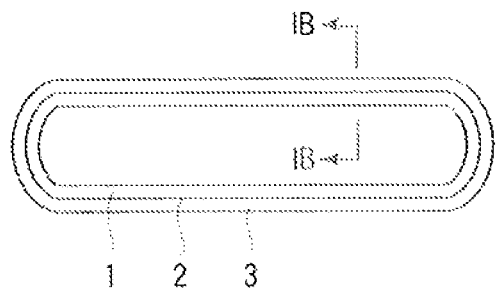
FIG. 1A is a front view of a conventional heat-resistant laminated conveyer belt.
Figure 1B:
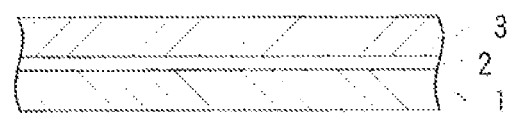
FIG. 1B is a cross-sectional view along with line IB-IB of FIG. 1A.
Figure 2:
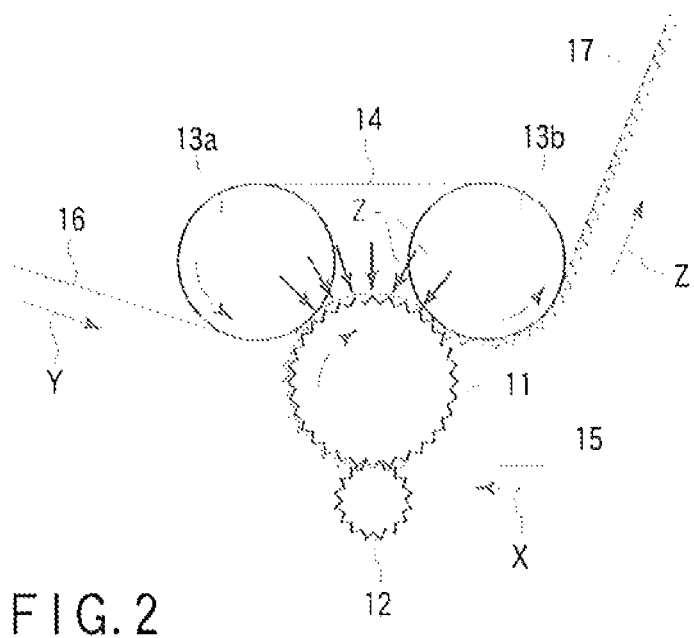
FIG. 2 is an explanatory view of a corrugated paper production machine using a bonding method based on a pressurizing belt.

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The present invention has been made taking into consideration the above circumstances. An object of the present invention is to provide a heat-resistant laminated conveyer belt having an improved strength and usable as a pressurizing belt of the corrugated board manufacturing process of various types of quality of paper.

Another object of the present invention is to provide a heat-resistant laminated conveyer belt having an improved strength and an improved surface hardness, and being usable as a pressurizing belt of the corrugated board manufacturing process of various types of quality of paper.

Another object of the present invention is to provide a heat-resistant laminated conveyer belt having an improved strength, an improved surface hardness, an improved abrasion resistance of the surface and a low-friction surface, and being usable as a pressurizing belt of the corrugated board manufacturing process of various types of quality of paper.

Hereinafter, the heat-resistant laminated conveyer belt according to embodiments of the present invention will be described in more detail.

As for the heat-resistant laminated conveyer belt according to the embodiments for example, the core and a material for a reinforcement layer are separately produced and they are laminated through a fluororesin film to be used as an adhesive layer.

In this case, the fluororesin film to be used as an adhesive layer is not limited. Preferably usable examples thereof include a tetrafluoroethylene-perfluoroalkyl vinyl ether copolymer resin (PFA resin) film having the highest heat resistance in meltable fluororesin films, tetrafluoroethylene-hexafluoropropylene copolymer resin (FEP resin) film, and a modified polytetrafluoroethylene resin (modified PTFE resin) film.

In order to avoid an uneven surface such as an overlap bonded area, a plain-weave seamless woven fabric is used for a core obtained by impregnating an aramid fiber woven fabric in a fluororesin dispersion and drying and sintering the fabric. In order to obtain high strength, the aramid fiber woven fabric is woven at the thread count near the limit. According to a first embodiment, dedicated research has been performed in order to achieve the thread count (amount of yarn per unit area) higher than that of a conventional product. As a result, the thread count as a whole has been increased by 1.1-fold by a method for increasing the diameter of yarn and reducing the yarn density (the number of yarn per constant interval). A 10% increase in hardness as the belt strength has been achieved by setting the thickness of the core to 1.0 mm or more and setting the mass to 1500 g/m2 or more. Further, in order to improve the traveling performance of the belt, S- and Z-twist weft yarns (yarns in the peripheral length direction of the belt) are alternatively arranged.

Figure 3A:
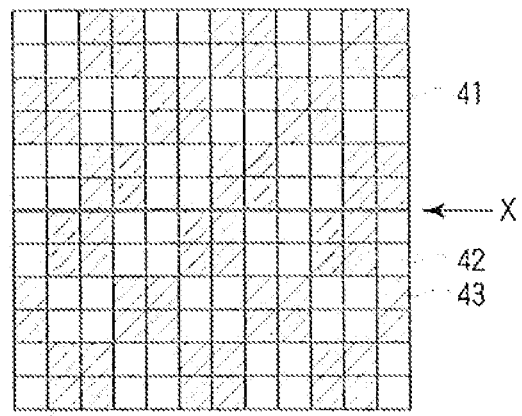
FIG. 3A is an explanatory view showing a weave texture of a folded back portion of a seamless cloth.

The plain-weave seamless woven fabric has an advantage of having no uneven surface. However, a folded back portion is present as a defect of the weaving method. Thus, the strength of the folded back portion is lower than that of other portions and the working life of the belt may be determined by the strength of the folded back portion, which is a problem. That is, a so-called hollow-weaving method to obtain the plain-weave seamless woven fabric comprises arranging a warp (yarn in the width direction of the belt) with a face warp yarn 41 and an under-warp yarn 42 as shown in FIG. 3A, allowing a weft yarn (yarn in the peripheral length direction of the belt) 43 to go back and forth twice to form a circular shape, and sequentially forming a tubular shape. In the hollow-weaving method, two folded back portions are formed between the face warp yarn 41 and the under-warp yarn 42. The arrangement of the weft yarn is shifted at one of the folded back portions during weaving because of the structure of the weave texture and the strength of the one folded back portion is lower than that of other portions. In FIG. 3A, a shaded area indicates the weft yarn 43 at the time of weaving (yarn in the peripheral length direction of the belt) and white areas indicate warp yarns 41 and 42 at the time of weaving (yarns in the width direction of the belt). The thick line portion indicated by an arrow X corresponds to the folded back portion of the seamless cloth.

Figure 3B:
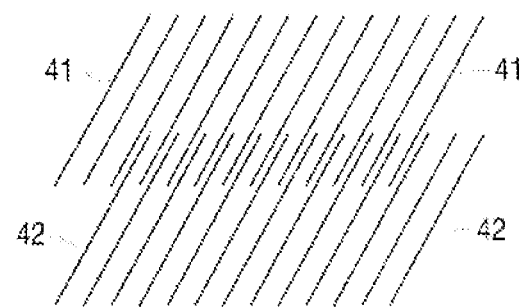
FIG. 3B is a pattern diagram showing one process of a weaving method using a plain-weave seamless loom.
Figure 3C:
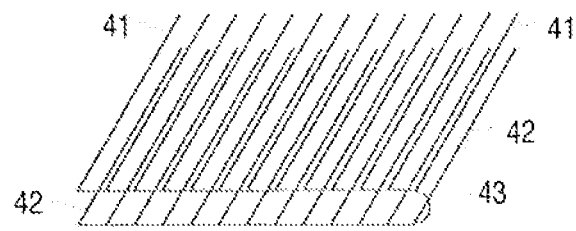
FIG. 3C is a pattern diagram showing one process of a weaving method using a plain-weave seamless loom.
Figure 3D:
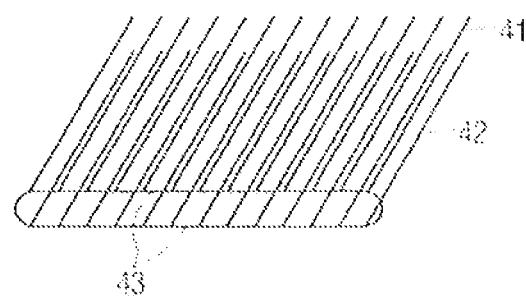
FIG. 3D is a pattern diagram showing one process of a weaving method using a plain-weave seamless loom.
Figure 3E:
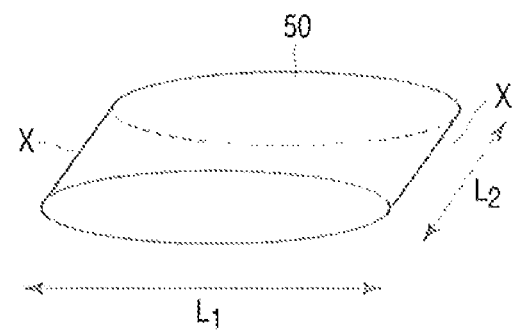
FIG. 3E is a perspective view showing a cylindrical woven fabric woven with the plain-weave seamless loom.

An example of the hollow-weaving method will be described in detail with reference to FIGS. 3B to 3F. As shown in FIG. 3B, the face warp yarn 41 and the under-warp yarn 42 are arranged one above the other. Then, a weft yarn 43 is woven into the face warp yarn 41, and the weft yarn 43 is folded back and woven into the under-warp yarn 42. The state so far is shown in FIG. 3C. As shown in FIG. 3D, the weft yarn 43 is folded back and woven into the face warp yarn 41. Thereafter, the weft yarn 43 is folded back and woven into the under-warp yarn 42. A cylindrical woven fabric shown in FIG. 3E is obtained by repeating a process of weaving the weft yarn 43 into the face warp yarn 41, folding back the weft yarn 43, weaving the weft yarn 43 into the under-warp yarn 42, and folding back the weft yarn 43. The peripheral length direction of the belt is indicated by L1 and the width direction of the belt is indicated by L2. Since the folding back of the weft yarn 43 is performed in two positions, two folded back portions X are present on the woven fabric.

Figure 3F:
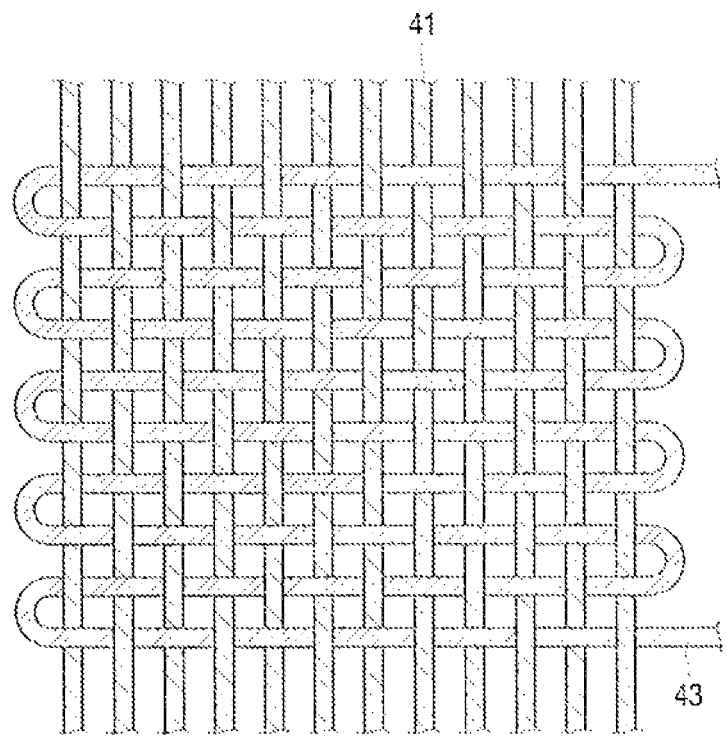
FIG. 3F is an enlarged pattern diagram showing a part of the weave texture of the woven fabric shown in FIG. 3E.

An enlarged pattern diagram of the weave texture when a part of the obtained woven fabric is observed from the side of the face warp yarn 41 is shown in FIG. 3F. The weft yarn 43 and the face warp yarn 41 are arranged one above the other and then the face warp yarn 41 and the weft yarn 43 are arranged one above the other, resulting in formation of a plain-weave texture. Since a basket weaving method is employed, two of each of the face warp yarn 41, the under-warp yarn 42, and the weft yarn 43 are used. FIG. 3F shows a state that the number of each yarn is one and each yarn is woven back and forth once to describe the plain-weave texture as a matter of convenience. Actually, as exemplified in FIG. 3A, a process of weaving one weave pattern back and forth is repeated twice.

Figure 4A:
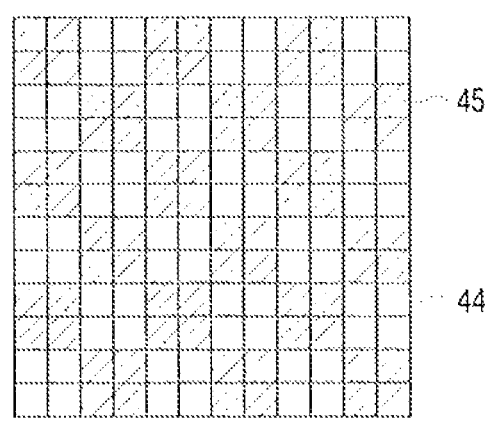
FIG. 4A is an explanatory view showing a weave texture by a circular loom.
Figure 4B:
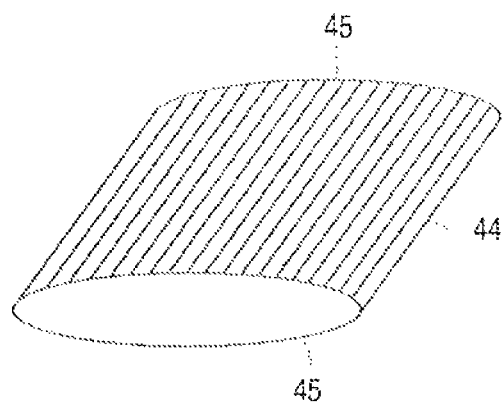
FIG. 4B is a pattern diagram showing one process of a weaving method using the circular loom.

When the woven fabric woven by the method is used as a seamless material, the weft yarn during weaving becomes a yarn in the running direction when used as the belt. Thus, the strength of the folded back portion causes a problem. In a second embodiment, a seamless woven fabric obtained by using the circular loom which does not produce a folded back portion is employed as the core in place of the plain-weave seamless woven fabric. The method of weaving a fabric by the circular loom comprises arranging a warp (yarn in the width direction of the belt) 44 in a cylindrical shape as shown in FIG. 4A, revolving a weft yarn (yarn in the peripheral length direction of the belt) 45 along the warps 44 arranged in the cylindrical shape to form a circular shape, and sequentially forming a tubular shape. In the case of the hollow-weaving method, a folded portion is actually not present and no partial change in the weave texture is caused, resulting in achievement of 25% of increase in the belt strength. One process of a weaving method using the circular loom is shown in FIG. 4B.

Figure 4C:
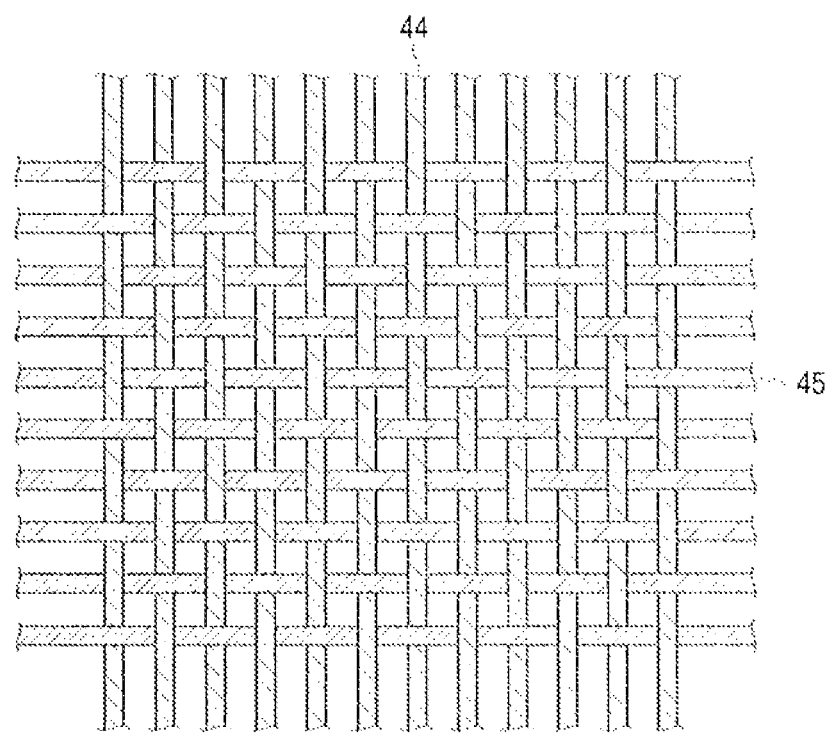
FIG. 4C is an enlarged pattern diagram showing a part of the weave texture of the woven fabric woven with the circular loom.

A pattern diagram of a part of the weave texture of the obtained woven fabric is shown in FIG. 4C. The warp yarn 44 and the weft yarn 45 are arranged one above the other and then the weft yarn 45 and the warp yarn 44 are arranged one above the other, resulting in formation of a plain-weave texture. Since a basket weaving method is employed, two of each of the warp yarn 44 and the weft yarn 45 are used. FIG. 4C shows a state that the number of each yarn is one and each yarn is woven back and forth once to describe the plainweave texture as a matter of convenience. Actually, as exemplified in FIG. 4A, a process of weaving one weave pattern back and forth is repeated twice.

Subsequently, in the present invention, an improvement in the hardness, abrasion resistance, low abrasion properties of the reinforcement layer which have an effect on the working life of the conveyer belt has been examined in addition to the strength and it has been achieved. That is, the surface hardness of the reinforcement layer influences bonding properties of the liner and the core paper during corrugated board production. When the surface hardness is low, the belt contact pressure when pressurizing and adhering the liner and the core paper reduced and a failure of adhesion between the liner and the core paper may be caused. Then, as for the reinforcement layer obtained by impregnating an aramid fiber woven fabric to which stretch properties are applied in a fluororesin dispersion and drying and sintering the fabric, it is contemplated to increase the hardness by a method of increasing the mass per unit area of a knitted fabric which is employed to give stretch properties.

However, there is a limit in the method. In the present invention, it is found that the hardness can be improved by thermal compression of a reinforcement layer material obtained by impregnating an aramid fiber woven fabric to which stretch properties are applied in a fluororesin dispersion and drying and sintering the fabric, followed by stacking the core and the reinforcement layer material as the laminated belt.

Further, the abrasion resistance and friction characteristics of the reinforcement layer have a large effect on the working life of the laminated belt. That is, the working life of the laminated conveyer belt depends on a difference in coefficient of friction between an area with high depth of wear and an area with low depth of wear on the surface of the reinforcement layer (belt surface). A defect such that the liner peels off the core paper of the corrugated board occurs. The defect is judged as the lifetime of the belt and the belt is detached and exchanged.

In the present invention, the abrasion resistance and the low-friction surface can be provided by stacking a PFA resin film on a reinforcement layer material which is thermally compressed and has a high hardness before the reinforcement layer material is incorporated into a belt. As a result, the lifetime of the belt can be significantly improved. Here, the thickness of the PFA resin film which can be suitably used is from about 50 to 1000 µm.

Subsequently, specific examples of the present invention will be described with reference to the drawings. The embodiment is not limited to the description below.

Example 1

Figure 5A:
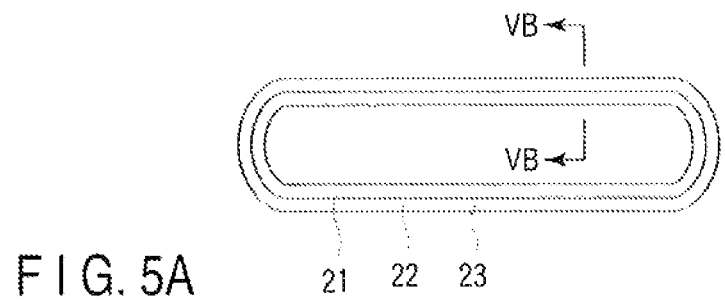
FIG. 5A is a plan view of the heat-resistant laminated conveyer belt according to Example 1.
Figure 5B:
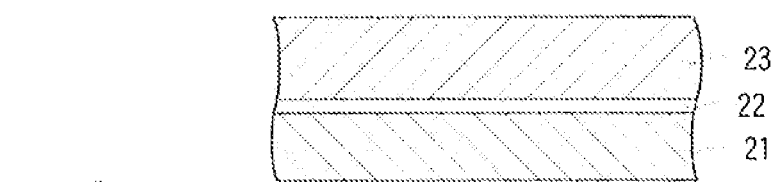
FIG. 5B is a cross-sectional view along with line VB-VB of FIG. 5A.

FIGS. 5A and 5B should be referred to. Here, FIG. 5A is a plan view of the heat-resistant laminated conveyer belt and FIG. 5B shows a cross-sectional view along with line VB-VB of FIG. 5A. A core 21 has a thickness of 1.0 mm and a mass of 1500 g/m² which is formed by impregnating an aramid fiber yarn hollow-woven (seamless) fabric described in Table 1 below in a PFA dispersion and drying and sintering the fabric. As for the weft yarn (yarn in the peripheral length direction of the belt) in Table 1, an S-twist weft yarn and a Z-twist weft yarn were alternately woven for each wood pipe. A reinforcement layer 23 having a thickness of 1.3 mm is formed on the core 21 (a so-called peripheral side) through a PFA film (adhesive layer) 22 having a thickness of 200 to 250 µm. The reinforcement layer 23 was obtained by repeating several times a process of impregnating a knitted aramid fiber fabric in a PTFE dispersion, drying the resultant fabric, and sintering it by burning.

TABLE 1

| | Used yarn | Density (yarn/25 mm) |
|---|---|---|
| Weft yarn | Trade name: Technora, Manufactured by Teijin Limited | 13 |

TABLE 1-continued

| | Used yarn | Density (yarn/25 mm) |
|---|---|---|
| Warp yarn | Trade name: Technora, Manufactured by Teijin Limited | 16 |

The heat-resistant laminated conveyer belts of FIGS. 5A and 5B are produced in the following manner. That is, the core 21, the adhesive layer 22, and the reinforcement layer 23 are superimposed in this order. The resultant product is arranged between both sides of a heat press board and heat-sealed under conditions (press pressure: about 0.5 MPa, temperature: 350° C., retention time: 85 seconds). Subsequently, the operation was repeated while transferring the belt onto the heat press at a pitch of board side length until the adhesive layer 22 and the reinforcement layer 23 were heat-sealed on the whole of the seamless core. The heat-resistant laminated conveyer belt in an endless form was obtained by integrating the adhesive layer 22 and the reinforcement layer 23 by the process.

The heat-resistant laminated conveyer belt according to Example 1 has a configuration in which the adhesive layer 22 and the reinforcement layer 23 are sequentially stacked on the core 21. The aramid fiber woven fabric of the core 21 is a woven fabric woven by the plain-weave seamless loom described in Table 1 above and includes the S- and Z-weft yarns (yarns in the peripheral length direction of the belt) alternately arranged. The core is configured to have a thickness of 1.0 mm and a mass of 1500 g/m2. Therefore, according to Example 1, a heat-resistant laminated conveyer belt which is used as a pressurizing belt in a process of producing corrugated boards composed of various types of quality of paper can be obtained by increasing the overall hardness of a laminated conveyer belt, improving the surface hardness and abrasion resistance of the surface, and applying a low-friction surface.

Example 2

Although it is not illustrated, a basic configuration of the heat-resistant laminated conveyer belt is similar to those of FIGS. 5A and 5B.

The core is formed by impregnating a woven fabric woven by the circular loom for aramid fiber yarn described in Table 2 below in a PFA dispersion and drying and sintering the fabric and has a thickness of 1.3 mm and a mass of 1500 g/m² or more. As for the weft yarn (yarn in the peripheral length direction of the belt) in Table 2, an S-twist weft yarn and a Z-twist weft yarn are alternately woven for each wood pipe. A reinforcement layer having a thickness of 1.3 mm is formed on the core through a PFA film (adhesive layer) having a thickness of 200 to 250 μm. The reinforcement layer was obtained by repeating several times a process of impregnating a knitted aramid fiber fabric in a PTFE dispersion, drying the resultant fabric, and sintering it by burning.

TABLE 2

| | Used yarn | Density (yarn/25 mm) |
|---|---|---|
| Weft yarn | Trade name: Technora, Manufactured by Teijin Limited | 12 |
| Warp yarn | Trade name: Technora, Manufactured by Teijin Limited | 18 |

The heat-resistant laminated conveyor belt of Example 2 is produced in the following manner. That is, the core, the adhesive layer, and the reinforcement layer are superimposed in this order. The resultant product is arranged between both sides of a heat press board and heat-sealed under conditions (press pressure: about 0.5 MPa, temperature: 350° C., retention time: 85 seconds). Subsequently, the operation was repeated while transferring the belt onto the heat press at a pitch of board side length until the adhesive layer and the reinforcement layer were heat-sealed on the whole of the seamless core. The heat-resistant laminated conveyer belt in an endless form was obtained by integrating the adhesive layer and the reinforcement layer by the process.

The heat-resistant laminated conveyer belt according to Example 2 has a configuration in which the adhesive layer and the reinforcement layer are sequentially stacked on the core. The aramid fiber woven fabric of the core is a woven fabric woven by the circular loom for aramid fiber yarn described in Table 2 above and includes the S- and Z-weft yarns (yarns in the peripheral length direction of the belt) alternately arranged. The core is configured to have a thickness of 1.3 mm and a mass of 1500 g/m². According to Example 2, when a seamless woven fabric obtained by using the circular loom which does not produce a folded back portion is employed as the core, the belt strength can be increased to about 25%.

Example 3

Although it is not illustrated, a basic configuration of the heat-resistant laminated conveyer belt is similar to those of FIGS. 5A and 5B.

In Example 3, a reinforcement layer material having a thickness of 1.3 mm was obtained by repeating several times a process of impregnating a knitted aramid fiber fabric in a PTFE dispersion, drying the resultant fabric, and sintering it by burning. Then, the reinforcement layer material was arranged between both sides of a heat press board. The material was compression-molded under conditions (press pressure: about 0.7 MPa, temperature: 350° C., retention time: 85 seconds) to form a reinforcement layer having a thickness of 0.7 mm. Successively, the reinforcement layer was heat-sealed on the same core as Example 1 through a PFA film having a thickness of 250 μm as an adhesive layer. Heat-sealing conditions are similar to those of Example 1.

According to Example 3, the hardness of the belt can be improved by using the material obtained by thermal compression molding the reinforcement layer in the thickness direction before the reinforcement layer is incorporated into the heat-resistant laminated conveyer belt.

Example 4

In Example 4 a PFA film having a thickness of 250 μm was superimposed on the heat-resistant laminated conveyer belt in an endless form obtained in Example 3. The resultant product was arranged between both sides of a heat press board and heat-sealed under conditions (press pressure: about 0.6 MPa, temperature: 340° C., retention time: 85 seconds). Subsequently, the operation was repeated while transferring the belt onto the heat press at a pitch of board side length until the PFA film was heat-sealed on the whole of the heat-resistant laminated conveyer belt. As a result, the heat-resistant laminated conveyer belt in an endless form was obtained by integrating the PFA film.

The heat-resistant laminated conveyer belt according to Example 4 has a configuration in which the adhesive layer, the reinforcement layer, and the PFA film are sequentially stacked on the core. The aramid fiber woven fabric of the core is a woven fabric woven by the plain-weave seamless loom described in Table 1 above and includes the S- and Z-weft yarns (yarns in the peripheral length direction of the belt) alternately arranged. The core is configured to be a woven fabric having a thickness of 1.0 mm and a mass of 1500 g/m². In Example 4, a PFA resin film is stacked on a reinforcement layer material which is heat-compressed and has a high hardness before the reinforcement layer material is incorporated into a belt. Accordingly, abrasion resistance and a low-friction surface are provided, and thus the lifetime of the belt can be significantly improved.

Example 5

A core having a thickness of 0.8 mm which is formed by impregnating an aramid fiber yarn hollow-woven (seamless) fabric described in Table 3 below in a PFA dispersion and drying and sintering the fabric is formed. The mass of the core was 1420 g/m². As for the weft yarn (yarn in the peripheral length direction of the belt) in Table 3, an S-twist weft yarn and a Z-twist weft yarn were alternately woven for each wood pipe. A reinforcement layer 23 having a thickness of 1.3 mm is formed on the core through the PFA film (adhesive layer) 22 having a thickness of 200 to 250 μm. The reinforcement layer 23 was obtained by repeating several times a process of impregnating a knitted aramid fiber fabric in a PTFE dispersion, drying the resultant fabric, and sintering it by burning.

Then, the core, the adhesive layer, and the reinforcement layer were superimposed in this order. The resultant product was arranged between both sides of a heat press board and heat-sealed under conditions (press pressure: about 0.5 MPa, temperature: 350° C., retention time: 85 seconds). Subsequently, the operation was repeated while transferring the belt onto the heat press at a pitch of board side length until the adhesive layer and the reinforcement layer were heat-sealed on the whole of the seamless core. The core, the adhesive layer and the reinforcement layer were integrated by the process and the heat-resistant laminated conveyer belt in an endless form was obtained.

Figure 6:
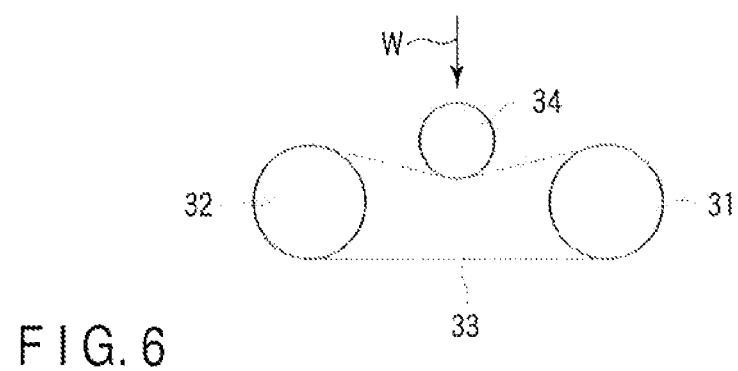
FIG. 6 is a pattern diagram showing a machine for testing the number of times of fracture bending fatigue.

The heat-resistant laminated conveyer belts of Examples 1 to 5 were run in a temperature atmosphere of 180° C. at a load 1.5 kN/cm width and a speed of 800 m/min with a testing device shown in FIG. 6, and then the fractural travel distance was examined. In this regard, in FIG. 6, a driving roll 31 drives a driven roll 32 as well as a conveyer belt 33. A load in a direction of an arrow W is applied on a load roll 34. The results are shown in Table 4 below.

TABLE 3

| | Used yarn | Density (yarn/25 mm) |
|---|---|---|
| Weft yarn | Trade name: Technora, Manufactured by Teijin Limited | 13 |
| Warp yarn | Trade name: Technora, Manufactured by Teijin Limited | 18 |

TABLE 4

| Belt test sample | Fractural travel distance (ten thousand/m) |
|---|---|
| Example 1 | 2500 |
| Example 2 | 3100 |
| Example 3 | 2480 |
| Example 4 | 2565 |
| Example 5 | 1850 |

When a Shore D hardness test of the belt surface was performed using the heat-resistant laminated conveyer belts of Example 3 and Example 5, the results shown in Table 5 below were obtained.

TABLE 5

| Belt test sample | Sore D hardness |
|---|---|
| Example 3 | 65.5 |
| Example 5 | 60.5 |

When the dynamic coefficient of friction of the belt surface using the heat-resistant laminated conveyor belts of Example 4 and 5 was measured, the results shown in Table 6 below were obtained. The liner used herein is one which can be gravure printed and has a high coefficient of friction. In Table 6, the test method was based on JISK7125 and the test was performed by bonding a corrugated board to a sliding piece. Taking into consideration the surface abrasion of the heat-resistant laminated conveyer belt on an actual machine, the dynamic coefficient of friction after polishing the belt with waterproof sandpaper (#80) 50 times was also measured in the same manner as above.

TABLE 6

| Belt test sample | Dynamic coefficient Of friction of surface | |
|---|---|---|
| | Initial state | After polishing belt 50 times |
| Example 4 | 0.13 | 0.20 |
| Example 5 | 0.12 | 0.29 |

As is clear from Table 6, the dynamic coefficient of friction of the surface of the belt of Example 4 after polishing the belt 50 times is lower than that of Example 5. Thus, when a core paper with rough texture is used, the core paper can be smoothly moved on the belt. The peripheral speeds of the belt at the center and the end in a belt width direction are different. According to Example 4, the core paper is smoothly moved on the belt, and thus peeling of the liner paper from the core paper due to a variation in the peripheral speed can be suppressed.

From the above results, it was demonstrated that the working life of the belts of Examples 1, 2, 3, and 4 as the heat-resistant laminated conveyer belt to be used for the corrugated board production machine could be significantly prolonged as compared with the belt shown in Example 5.

The cores used in Examples had a thickness of 1.0 to 1.3 mm and a mass of 1500 g/m², however they are not limited to these values if sufficient core strength is obtained. For example, even if the mass of the core to be used in Example 2 is changed to 1650 g/m², the same effect can be obtained. The thickness of the core is preferably 1 mm or more and 3 mm or less. The mass of the core is preferably 1500 g/m² or more and 3000 g/m² or less.

In Examples, as the aramid fiber woven fabric to which stretch properties were applied, the knitted aramid fiber fabric was used, however, it is not particularly limited thereto as long as it is an aramid fiber woven fabric with stretch properties. For example, an aramid fiber woven fabric produced by moss knitting, warp knitting (for example, Denbigh knitting, code knitting, and atlas knitting), weft knitting (for example, flat knitting, rib knitting, and pearl knitting) or the like has stretch properties, and thus they can be used.

In Example 1, an S-twist weft yarn and a Z-twist weft yarn were alternatively arranged, and the interval of the S-twist weft yarn and the interval of the Z-twist weft yarn were respectively set to about 25 mm. However, the present invention is not limited to the arrangement. The S-twist weft yarn and the Z-twist weft yarn may be arranged across the warp in the width direction of the belt. For example, two of the S-twist weft yarns and two of the Z-twist weft yarns can be alternatively arranged (S, S, Z, Z). In this case, the changing of the S-twist weft yarn to the Z-twist weft yarn is performed at intervals of about 50 mm.

In Example 2, an S-twist weft yarn and an Z-twist weft yarn were alternatively arranged, however the present invention is not limited to the arrangement. In the case of the circular loom used in Example 2, a yarn can be woven in a spiral form, for example, by a simultaneous rotation of three to four shuttles. Thus, a certain number of the weft yarns can be alternatively woven by changing a direction of twisting yarns which are set to the shuttles to the S-twist or the Z-twist. Accordingly, the yarn arrangement is easily changed as compared with the case of the shuttle loom used in Example 1. Thus, for example, in addition to the alternative arrangement of two of the S-twist weft yarns and two of the Z-twist weft yarns (S, S, Z, Z), three of the S-twist weft yarns and three of the Z-twist weft yarns can be alternatively arranged (S, S, S, Z, Z, Z).

When one or more of the S-twist weft yarns and one or more of the Z-twist weft yarns are alternatively arranged, the stress to be applied to the belt can be relaxed. This enables the traveling performance of the belt to be improved. In order to arrange the S-twist weft yarn and the Z-twist weft yarn with respect to the warp, the number of the S-twist weft yarn and the number of the Z-twist weft yarn are desirably equal so as to perform the changing of the S-twist weft yarn to the Z-twist weft yarn at equal intervals.

It is to be noted that the present invention is not limited to the above embodiments as they are, and in an implementing stage, constituent elements can be modified and embodied without departing from the scope of the present invention. Moreover, an appropriate combination of a plurality of constituent elements disclosed in the above embodiments can form various inventions. For example, several constituent elements may be deleted from all the constituent elements described in the embodiments. Furthermore, the constituent elements of the different embodiments may appropriately be combined.

According to the present invention, the heat-resistant laminated conveyer belt having an improved overall strength and usable as a pressurizing belt in a process of producing corrugated boards composed of various types of quality of paper. According to the present invention, the heat-resistant laminated conveyer belt having an improved overall strength and an improved surface hardness, and being usable as a pressurizing belt of the corrugated board manufacturing process of various types of quality of paper.

According to the present invention, the heat-resistant laminated conveyer belt having an improved overall strength, an improved surface hardness, an improved abrasion resistance of the surface and a low-friction surface, and being usable as a pressurizing belt of the corrugated board manufacturing process of various types of quality of paper.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of producing a heat-resistant laminated conveyer belt which comprises a fluororesin-coated core obtained by impregnating an aramid fiber woven fabric with a fluororesin dispersion and drying and sintering the fabric; and a reinforcement layer which is formed on the core through an adhesive layer and obtained by impregnating an aramid fiber woven fabric to which stretch properties are applied with a fluororesin dispersion and drying and sintering the fabric; and wherein the aramid fiber woven fabric of the core is a woven fabric by a plain-weave seamless loom and the woven fabric includes an S-twist weft yarn and a Z-twist weft yarn which are alternatively arranged, and
the method comprising:
thermally compression molding the reinforcement layer in a thickness direction of the reinforcement layer before thermally pressing the core, the reinforcement layer, and the adhesive layer arranged between the core and the reinforcement layer.

2. The method according to claim 1, which comprises thermally sealing a tetrafluoroethylene-perfluoroalkyl vinyl ether copolymer resin film on the reinforcement layer.

3. The method according to claim 2, wherein the core has a thickness of 1.0 mm or more and a mass of 1500 g/m$^2$ or more.

4. The method according to claim 2, wherein the core has the thickness of 1 to 3 mm and the mass of 1500 to 3000 g/m$^2$.

5. The method according to claim 4, wherein the number of the S-twist weft yarn and the number of the Z-twist weft yarn are plural.

6. A method of producing a heat-resistant laminated conveyer belt which comprises a fluororesin-coated core obtained by impregnating an aramid fiber woven fabric with a fluororesin dispersion and drying and sintering the fabric; and a reinforcement layer which is formed on the core through an adhesive layer and obtained by impregnating an aramid fiber woven fabric to which stretch properties are applied with a fluororesin dispersion and drying and sintering the fabric; wherein the aramid fiber woven fabric of the core is a woven fabric by a circular loom and the woven fabric includes an S-twist weft yarn and a Z-twist weft yarn which are alternatively arranged, and
the method comprising:
thermally compression molding the reinforcement layer in a thickness direction of the reinforcement layer before thermally pressing the core, the reinforcement layer, and the adhesive layer arranged between the core and the reinforcement layer.

7. The method according to claim 6, which comprises thermally sealing a tetrafluoroethylene-perfluoroalkyl vinyl ether copolymer resin film on the reinforcement layer.

8. The method according to claim 7, wherein the core has a thickness of 1.0 mm or more and a mass of 1500 g/m or more.

9. The method according to claim 7, wherein the core has the thickness of 1 to 3 mm and the mass of 1500 to 3000 g/m².

10. The method according to claim 9, wherein the number of the S-twist weft yarn and the number of the Z-twist weft yarn are plural.

* * * * *

UNITED STATES PATENT AND TRADEMARK OFFICE
CERTIFICATE OF CORRECTION

PATENT NO. : 9,643,347 B2  Page 1 of 1
APPLICATION NO. : 14/678721
DATED : May 9, 2017
INVENTOR(S) : T. Nitta et al.

It is certified that error appears in the above-identified patent and that said Letters Patent is hereby corrected as shown below:

| Column | Line | Error |
|---|---|---|
| 12 (Claim 8, Line 2) | 66 | "1500 g/m" should read --1500 $g/m^2$-- |

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*